United States Patent [19]

Takedomi et al.

[11] Patent Number: 5,087,844
[45] Date of Patent: Feb. 11, 1992

[54] LINEAR MOTOR

[75] Inventors: Seiki Takedomi, Fukaya; Teruo Umehara, Hanyu, both of Japan

[73] Assignee: Hitachi Metals, Ltd., Tokyo, Japan

[21] Appl. No.: 610,114

[22] Filed: Nov. 7, 1990

[30] Foreign Application Priority Data

Nov. 7, 1989 [JP] Japan .................. 1-289192

[51] Int. Cl.$^5$ .................. H02K 41/02; H02K 41/00
[52] U.S. Cl. .................. 310/12; 310/13; 318/135
[58] Field of Search .................. 310/12, 13, 14, 15, 310/154; 318/135

[56] References Cited

U.S. PATENT DOCUMENTS

| | | | |
|---|---|---|---|
| 4,704,553 | 11/1987 | Resnicow | 310/12 |
| 4,839,543 | 6/1989 | Beakley et al. | 310/12 |
| 4,908,533 | 3/1990 | Karita et al. | 310/12 |
| 4,937,485 | 6/1990 | Mikalko | 310/12 |

FOREIGN PATENT DOCUMENTS

| | | | |
|---|---|---|---|
| 58-49100 | 1/1983 | Japan | 310/12 |
| 62-193543 | 8/1987 | Japan | 310/12 |
| 63-93783 | 6/1988 | Japan | 310/12 |

*Primary Examiner*—Steven L. Stephan
*Assistant Examiner*—Matthew Nguyen
*Attorney, Agent, or Firm*—Finnegan, Henderson, Farabow, Garrett & Dunner

[57] ABSTRACT

In a linear motor having at least one pair of permanent magnet assemblies opposing each other via a gap therebetween, each of the permanent magnet assemblies is constituted by a plurality of permanent magnets, and each of the permanent magnets has, in a plane perpendicular to the moving direction of a movable member, a cross section satisfying the relation: $Ac > Ae$, wherein Ac represents a cross section in a center portion of the permanent magnet and Ae represents a cross section at each end of the permanent magnet, to obtain a substantially sinusoidal magnetic flux density distribution. Preferably, the permanent magnet has on the side facing the gap a flat center surface and inclined flat surfaces positioned on both sides of the center surface.

6 Claims, 7 Drawing Sheets 5,087,844

LINEAR MOTOR

BACKGROUND OF THE INVENTION

The present invention relates to a linear motor of the type in which a movable coil moves linearly in a gap formed by opposing permanent magnets.

As driving apparatuses for accurately positioning members within a long stroke of 10-100 cm or so, movable coil-type linear motors as disclosed in Japanese Patent Publication No. 58-49100 and Japanese Utility Model Laid-Open No. 63-93783 are conventionally used in wide applications. In these linear motors, a plurality of permanent magnets magnetized in their thickness directions are arranged in opposite to each other such that their magnetic poles of different polarities face each other, and movable coil assemblies are disposed in gaps formed by the opposing permanent magnets, so that they can move linearly in a direction perpendicular to the magnetic fluxes.

In such linear motors, the magnetic circuits do not have center yokes, and magnetic fluxes constitute a plurality of closed loops in the gaps, avoiding the concentration of the magnetic fluxes in a part of the magnetic path. Accordingly, it is possible to generate a uniform magnetic flux density distribution over the entire length of a long stroke.

FIG. 10 shows a typical conventional linear motor. This linear motor comprises yokes 1, 1 in the shape of a flat plate made of a ferromagnetic material such as a steel plate, a pair of permanent magnet assemblies, and a movable coil 5. Each permanent magnet assembly is constituted by a plurality of permanent magnets 2, 2 . . . magnetized in their thickness directions and arranged longitudinally along the yoke 1, such that N and S magnetic poles appear on their surfaces alternately. The permanent magnets 2, 2 . . . are fixed to each yoke 1, and a pair of yokes 1, 1 are fixed by support members 4, 4, such that the permanent magnets 2, 2 . . . fixed to each yoke 1, 1 are opposing each other via a gap 3 with their opposite magnetic poles facing each other. The support members 4, 4 are preferably made of a ferromagnetic material like the yokes 1, 1. A movable coil 5 is constituted by a flat multi-phase coil having a winding direction perpendicular to magnetic fluxes in the gap 3. Specifically, the movable coil 5 is constituted by a plurality of coils arranged along the longitudinal direction of the permanent magnet assembly while overlapping except for their small parts. The directions of magnetic poles are detected by magnetic flux detectors, etc. to switch coils to which electric current is supplied and to change its direction. Incidentally, the movable coil 5 is integrally supported by a movable member (not shown).

In the above structure, when the movable coil 5 is supplied with electric current, the electric current flowing in the movable coil 5 crosses at right angles the magnetic flux generated by the permanent magnets 2. Accordingly, by Fleming's left hand rule, the movable coil 5 is subjected to a driving force in a longitudinal direction of the yokes 1, 1. Thus, the movable member (not shown) integrally supporting the movable coil 5 moves longitudinally along the yokes 1, 1. Next, when electric current in an opposite direction is supplied to the movable coil 5, a driving force in an opposite direction is generated, thereby moving the movable member in an opposite direction. Accordingly, by controlling electric current supplied to the movable coil 5, the movable member can be moved and stopped at a desired position.

In the linear motor of the above structure, each permanent magnet 2 has a rectangular cross section, so that every permanent magnet 2 has the same cross section in a plane perpendicular to the moving direction of the movable member. In other words, every permanent magnet has the same thickness and the same width. Also, between the adjacent permanent magnets 2, 2, there is a gap or an adhesive layer or short-circuiting of the magnetic flux, resulting in smaller magnetic flux density than that in the center portion of each permanent magnet 2. Accordingly, in the entire length of the permanent magnet assembly, the magnetic flux distribution in the moving direction of the movable coil 5 substantially has a wave form constituted by a repetition of a semi-circle.

In general, in a motor having a rotator constituted by permanent magnets and a stator armature disposed around the rotator, the magnetic flux of the rotator and the magnetomotive force of the armature should be kept perpendicular to each other. For this purpose, it is necessary to obtain an sinusoidal armature current and a sinusoidal magnetic flux distribution in the gap between the permanent magnet rotator and the stator armature by a proper controlling circuit. By meeting this requirement, a torque generated by the motor depends only on the product of maximum values of the armature current and the magnetic flux density regardless of the displacement angle of the rotator from a reference axis. In other words, a torque ripple due to the above displacement angle can be prevented.

On the other hand, the structure of a linear motor is considered that the above rotator and armature have infinite diameters. Accordingly, the above principle is applicable. Thus, if the magnetic flux density distribution of the permanent magnet assembly in the moving direction of the movable coil 5 in FIG. 10 has a sinusoidal wave form, the torque ripple due to the movement of the movable coil 5 can be eliminated, leading to a linear motor having excellent linearity.

However, in the above conventional linear motor, the magnetic flux density distribution in the moving direction of the coil 5 is not in a sinusoidal wave form due to the shapes of permanent magnets 2, resulting in torque ripple and poor linearity, which in turn leads to low positioning accuracy.

Japanese Utility Model Laid-Open No. 63-93783 discloses a dc linear motor in which permanent magnets opposing an armature have smooth recesses at boundaries of adjacent magnets having opposite magnetic poles to reduce a ripple of a driving force.

However, since this linear motor has a position detector (magnetoelectric conversion element) for each coil to reverse the direction of current supplied to the coil, each coil should have a current control means. Accordingly, when it has a large number of coils to obtain a larger driving force, its structure becomes rather complicated.

In addition, although there are smooth recesses (almost circular in cross section) at boundaries between adjacent magnets, magnetic flux is likely to be concentrated in such recesses, resulting in a reduced peak value of magnetic flux density. Also, the resulting magnetic flux density distribution has a relatively sharp wave form. This reference further mentions that in this linear motor, sinusoidal current is supplied to the coils. However, this sinusoidal current is obtained by the influence of the sinusoidal magnetic flux distribution on the outputs of the position detectors, and this does not change the fact that this linear motor is a dc-linear control type.

OBJECT AND SUMMARY OF THE INVENTION

Accordingly, an object of the present invention is to provide a linear motor suffering from reduced torque ripple, thereby obviating the problems inherent in the above conventional techniques.

The linear motor according to the present invention comprises:

(a) at least one pair of permanent magnet assemblies opposing each other via a gap therebetween, each of the permanent magnet assemblies being constituted by a plurality of permanent magnets arranged such that adjacent permanent magnets in each assembly have magnetic poles of opposite polarities on their surfaces facing the gap, and that permanent magnets opposing each other via the gap also have magnetic poles of opposite polarities on their surfaces facing the gap;

(b) a movable member comprising at least one multi-phase coil assembly constituted by a plurality of flat coils and movable in the gap in a direction parallel to the permanent magnet assemblies; and (c) a driving circuit for supplying a sinusoidal current to the multi-phase coil assembly, each of the permanent magnets having in a plane perpendicular to the moving direction of the movable member a cross section satisfying the relation: $Ac > Ae$, wherein Ac represents a cross section in a center portion of the permanent magnet and Ae represents a cross section at each end of the permanent magnet.

In the linear motor of the present invention, the permanent magnet desirably has a thickness meeting the relation: $Tc > Te$, wherein Tc represents a thickness in a center portion of the permanent magnet, and Te represents a thickness at each end of the permanent magnet, and a width $Wc > We$, wherein Wc represents a width in a center portion of the permanent magnet, and We represents a width at each end of the permanent magnet.

DETAILED DESCRIPTION OF THE INVENTION

Figure 1:
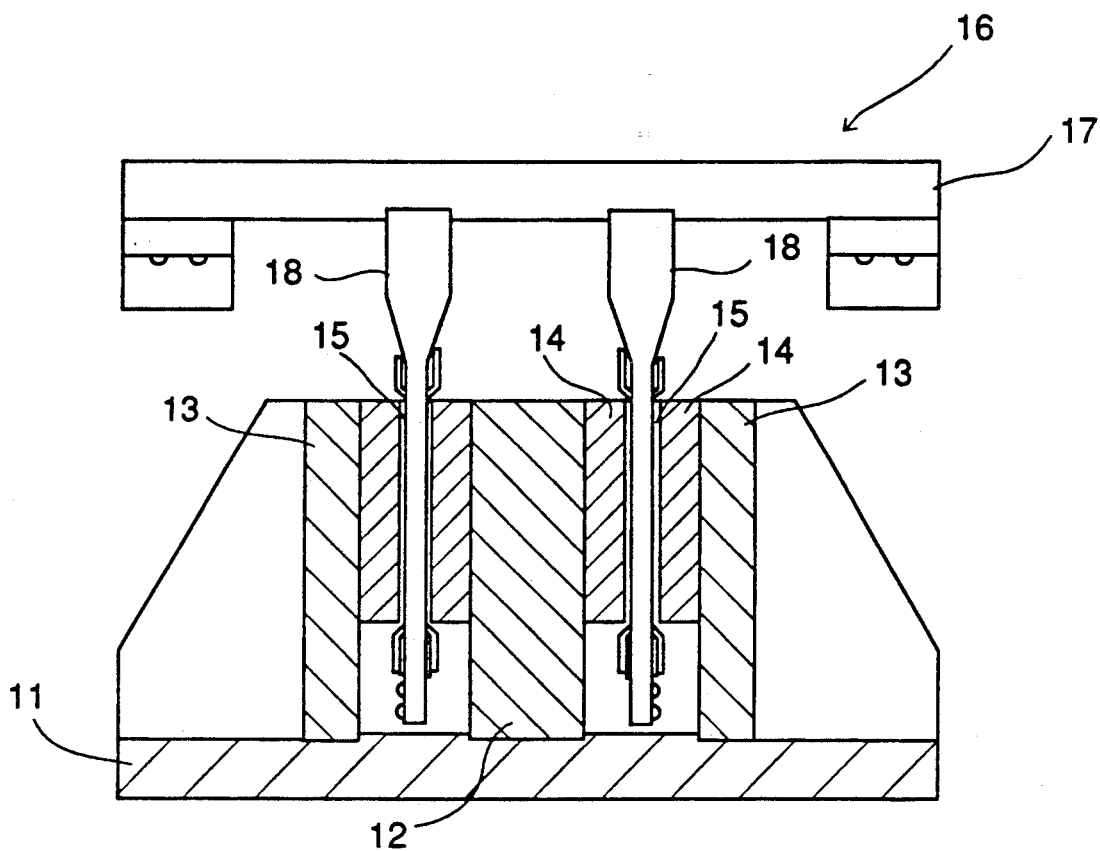
FIG. 1 is a cross-sectional view showing an important portion of the linear motor according to one embodiment of the present invention.

Referring to FIG. 1, the linear motor of the present invention comprises a base 11 constituted by a flat plate made of a ferromagnetic material such as steel, a center yoke 12 and side yokes 13, 13 each constituted by a flat plate made of the same material as the base 11. The center yoke 12 and the side yokes 13, 13 are fixed to the base 11 at proper distances therebetween. Fixed to the center yoke 12 and the side yokes 13, 13 are permanent magnet assemblies each constituted by a plurality of permanent magnets 14, 14 . . . and opposing permanent magnet assemblies define a gap 15 through which a coil frame 18 moves back and forth.

Figure 3:
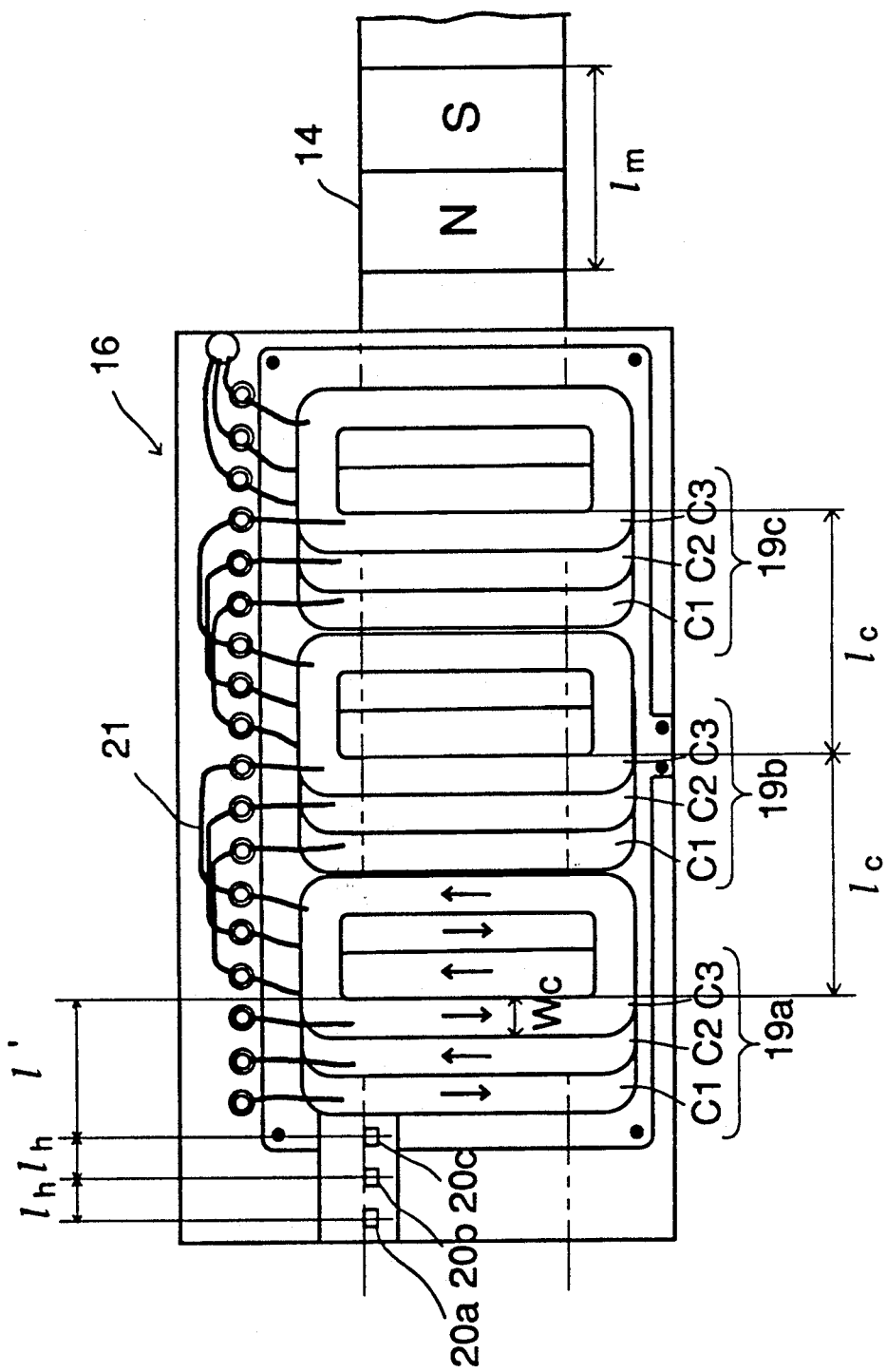
FIG. 3 is a side view showing the positional relation between position detectors and multi-phase coils in the linear motor.

As shown in FIG. 3, a plurality of permanent magnets 14, 14 . . . are fixed to the yoke such that adjacent permanent magnets 14, 14 have opposite magnetic poles on their surfaces facing the gap 15, and that permanent magnets 14, 14 opposing each other via the gap 15 have also opposite magnetic poles.

In FIG. 1, the arrangement of the permanent magnets 14 is in a direction perpendicular to the paper. The linear motor further comprises a movable member 16 constituted by a carriage 17, and coil frames 18, 18 fixed to a lower portion of the carriage 17. The movable member 16 is movable along the permanent magnet assemblies such that each coil frame 18 moves back and forth in the gap 15 in a direction perpendicular to the paper. The coil frame 18 is made of a nonmagnetic material to avoid the generation of the ripple of the driving force. For instance, it is formed by an aluminum alloy frame subjected to an almite surface treatment for insulation and a resin coating such as a glass fiber-reinforced epoxy resin coating formed on the surface of the aluminum frame. Incidentally, if the coil frame is made of a magnetic material or if the linear motor is provided with a back yoke, it is attracted to the permanent magnets, causing imbalance in the driving force which leads to the ripple of the driving force. The multi-phase coils 19 are fixed to both surfaces of the coil frame 18.

Figure 2:
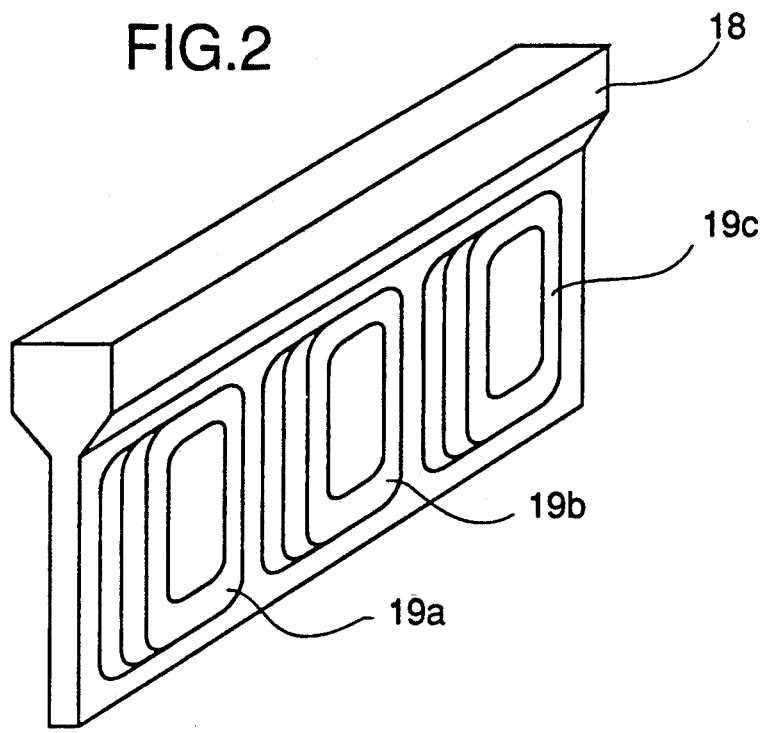
FIG. 2 is a perspective view showing a coil frame contained in the linear motor shown in FIG. 1.

FIG. 2 shows a coil frame 18 provided with three multi-phase coils 19a, 19b, 19c, which are three-phase coils in this embodiment, on each side. The three-phase coils themselves are disclosed in Japanese Patent Laid-Open No. 62-193543. In each three-phase coil 19a, 19b, 19c, the coils are in Y-connection, and each three-phase coil is series-connected.

In the present invention, a sinusoidal driving current is supplied to such multi-phase coils. Since multi-phase coils having larger phases shows smaller power factor, necessitating larger input current, two-phase or three-phase coils are desirable. In the linear motor of the present invention, a magnetic circuit constituted by permanent magnets having particular shapes is desirably combined with a driving circuit for providing two-phase or three-phase sinusoidal output current.

FIG. 3 shows the three-phase coils and position detectors. In this figure, the same reference numerals as in FIG. 1 are assigned to the same members as in FIG. 1. The movable member 16 comprises three three-phase coils 19a, 19b, 19c, each constituted by three flat coils $C_1$, $C_2$, $C_3$ having a width Wc of 1/6 of magnetic pitch $l_m$ arranged in parallel to the paper. Each flat coil $C_1$, $C_2$, $C_3$ overlaps except for the width Wc of each coil. Each coil is connected to a lead wire 21. The movable member 16 further comprises three position detectors 20a, 20b, 20c, at an interval $l_h$, 1/6 of the coil pitch $l_c$ (= magnetic pitch $l_m$). Each position detector 20a, 20b, 20c is separate from the corresponding coil $C_1$, $C_2$, $C_3$, by a distance l', but this separation can be electrically compensated. A driving circuit generates a three-phase current wave form at a phase angle of 120°, and this three-phase current is supplied to the coils in directions shown by the arrows in FIG. 3, to move the movable member 16 continuously. Incidentally, in the case of three-phase current, the distance $l_h$ between the detectors 20a, 20b, 20c is theoretically ⅓ of $l_c$ (=$l_m$), but it is actually 1/6 in FIG. 3 for practical reasons. This is because the coils may be disposed at any positions at intervals of 180°×n by reversing the direction of current.

In the present invention, the coil to which current is supplied and the direction of such current are switched by the position detectors and the control circuit. The position detectors may be known elements such as Hall elements. The control circuit may be the same as in usual synchronous ac servo motors provided with permanent magnet excitation.

Even when 6 three-phase coils are connected, position detection can be achieved by using three position detectors. In this case, a single-phase or three-phase sinusoidal current is supplied, and its synchronization can be achieved by the timing of reversing the Hall elements from positive to negative or from negative to positive.

Incidentally, in the case of a two-phase current type, the movable member is provided with Hall elements at an interval of ¼ of the magnetic pole pitch, and a two-phase current wave form having 90° phase shift is generated by the driving circuit and supplied to the coils.

Figure 4:
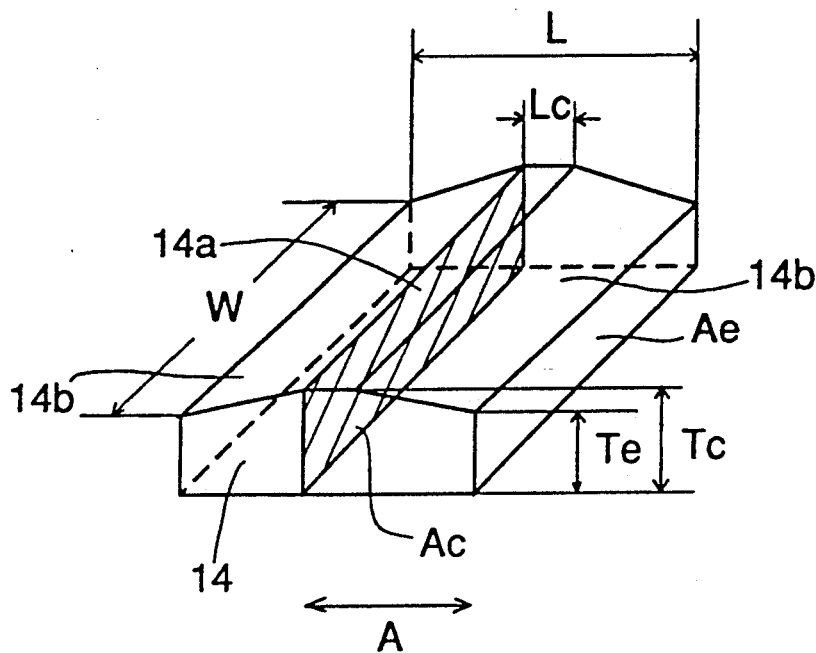
FIG. 4 is a perspective view showing the shape of a permanent magnet according to one embodiment of the present invention.

FIG. 4 shows the shape of a permanent magnet 14 which is most preferably used in the linear motor shown in FIG. 1. These permanent magnets 14, 14 . . . are arranged in the moving direction of the coil frame 18 shown by the arrow A. Each permanent magnet has a substantially flat center surface 14a, and slightly inclined and substantially flat surfaces 14b, 14b positioned on both sides of the center surface 14a, on the side facing the gap 15 (upper side in the FIGURE). Each permanent magnet 14 has the same width W. Accordingly, a cross section Ac of the center portion of the permanent magnet 14 in a plane perpendicular to the moving direction of the movable member 16 (vertical cross section) is larger than a cross section Ae at each end of the permanent magnet 14.

A typical example of the preferred permanent magnets has the following size:
Tc: 10 mm.
Te: 6.5 mm.
L: 30 mm.
Lc: 6 mm.
W: 50 mm.

Each permanent magnet 14 is magnetized in a thickness direction, namely vertically in FIG. 4.

Figure 6A:
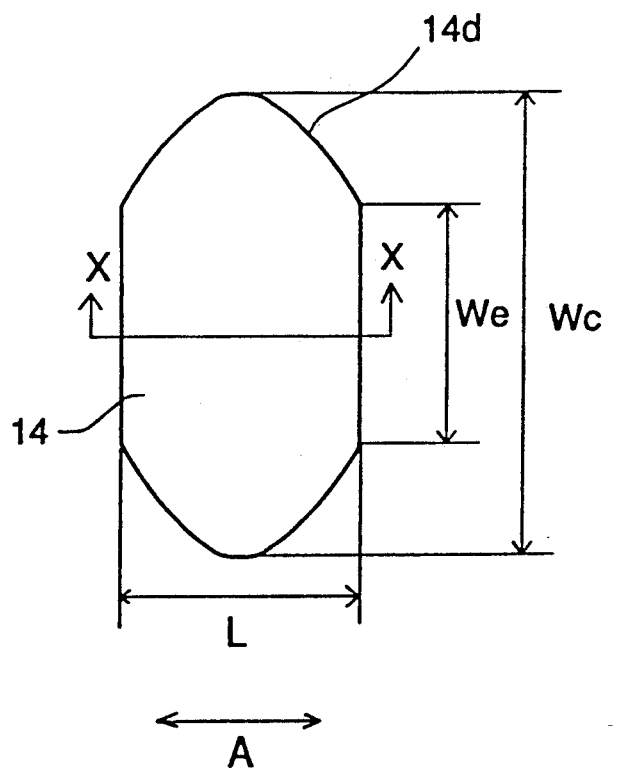
FIG. 6(a) is a plan view showing the shape of a permanent magnet according to another embodiment of the present invention.
Figure 6B:
FIG. 6(b) is a cross-sectional view taken along the line X—X in FIG. 6(a)

FIGS. 6(a), (b) show the shape of a permanent magnet according to another embodiment of the present invention. This permanent magnet has a width Wc in a center portion and a width We at each end. This permanent magnet 14 has sinusoidal surfaces 14d, 14d on both sides. With respect to the vertical cross section parallel to the arrow A, it is rectangular as shown in FIG. 6(b). A typical example of this permanent magnet 14 has the following shape:
Wc: 50 mm.
We: 26 mm.
L: 30 mm.
T: 10 mm.

Figure 7:
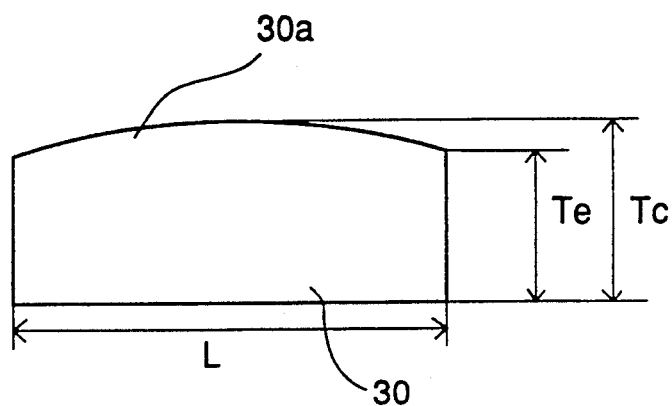
FIG. 7 is a cross-sectional view showing the shape of a permanent magnet according to a further embodiment of the present invention.

FIG. 7 shows a permanent magnet according to a further embodiment of the present invention. The permanent magnet 30 shown in FIG. 7 has a circular center surface 30a. Incidentally, the permanent magnet of FIG. 7 differs from that shown in FIG. 4 in that the former has a circular surface 30a.

The preferred shape of this permanent magnet of FIG. 7 is as follows:
Tc: 10 mm.
Te: 7 mm.
L: 30 mm.

EXAMPLE 1

Permanent magnets of FIG. 4 having the size shown below were assembled in the linear motor shown in FIG. 1, and a magnetic flux density distribution in the moving direction of the movable member 16, namely along the stroke, was measured.
Tc: 10 mm.
Te: 6.5 mm.
L: 30 mm.
Lc: 6 mm.
W: 50 mm.

Figure 5:
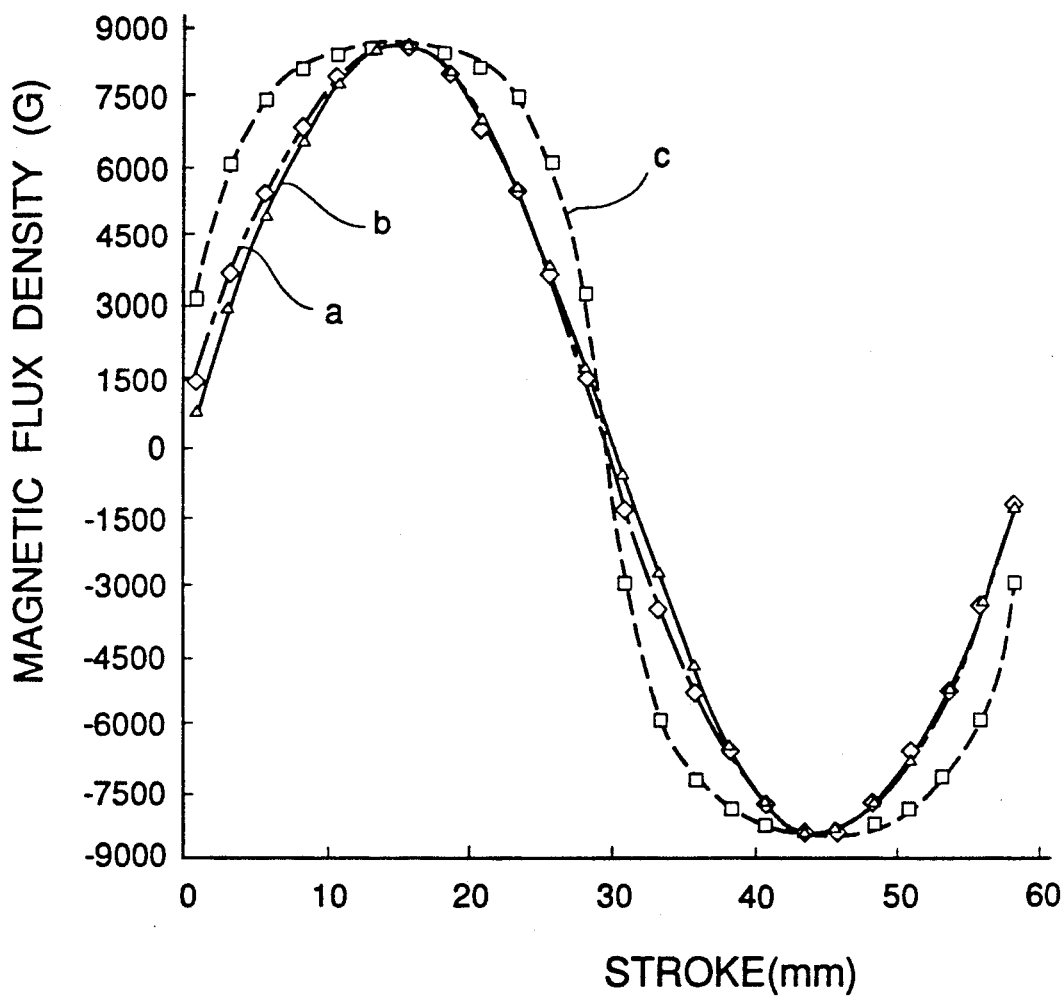
FIG. 5 is a graph showing the relation between a stroke and magnetic flux density.

FIG. 5 shows the results in which a curve "a" shows a magnetic flux density distribution in Example 1, extremely resembling a sinusoidal curve shown by "b." Incidentally, a curve "c" shown in FIG. 5 represents a magnetic flux density distribution obtained by a conventional linear motor in which each permanent magnet was a rectangular parallelepiped having a width of 50 mm, a length of 30 mm, and a thickness of 10 mm. As is clear from FIG. 5, the curve "c" is constituted by semi-oval or semicircular curves, extremely different from the sinusoidal curve "b." Accordingly, the curve "c" produces a large torque ripple, leading to poor linearity. On the other hand, in the linear motor of the present invention, the torque ripple is extremely reduced, showing excellent linearity.

EXAMPLE 2

Permanent magnets of FIG. 6 having the size shown below were assembled in the linear motor shown in FIG. 1, and a magnetic flux density distribution in the moving direction of the movable member 16, namely along the stroke, was measured.
Wc: 50 mm.
We: 26 mm.
L: 30 mm.
T: 10 mm.

It was confirmed by the measurement of the magnetic flux density distribution of the permanent magnet shown in FIG. 6 along the arrow A that it was substantially in a sinusoidal wave form like the curve "a" in FIG. 5.

COMPARATIVE EXAMPLE 1

Figure 8:
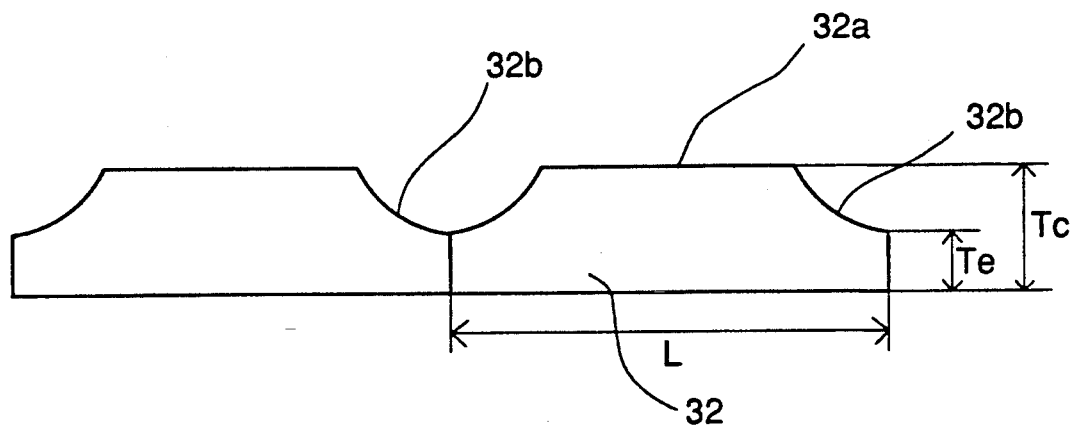
FIG. 8 is a cross-sectional view showing the shape of a permanent magnet in Comparative Example 1.

For comparison, a permanent magnet having the shape shown in FIG. 8 was produced. The permanent magnet 32 shown in FIG. 8 had a wide flat center surface 32a and small circular recesses 32b, 32b at both top ends.

Its shape was as follows:
Te: 10 mm.
Tc: 5 mm.
L: 30 mm.

The permanent magnet of FIG. 8 differs from that of the present invention in that the former has circular recesses 32b, 32b.

Figure 9:
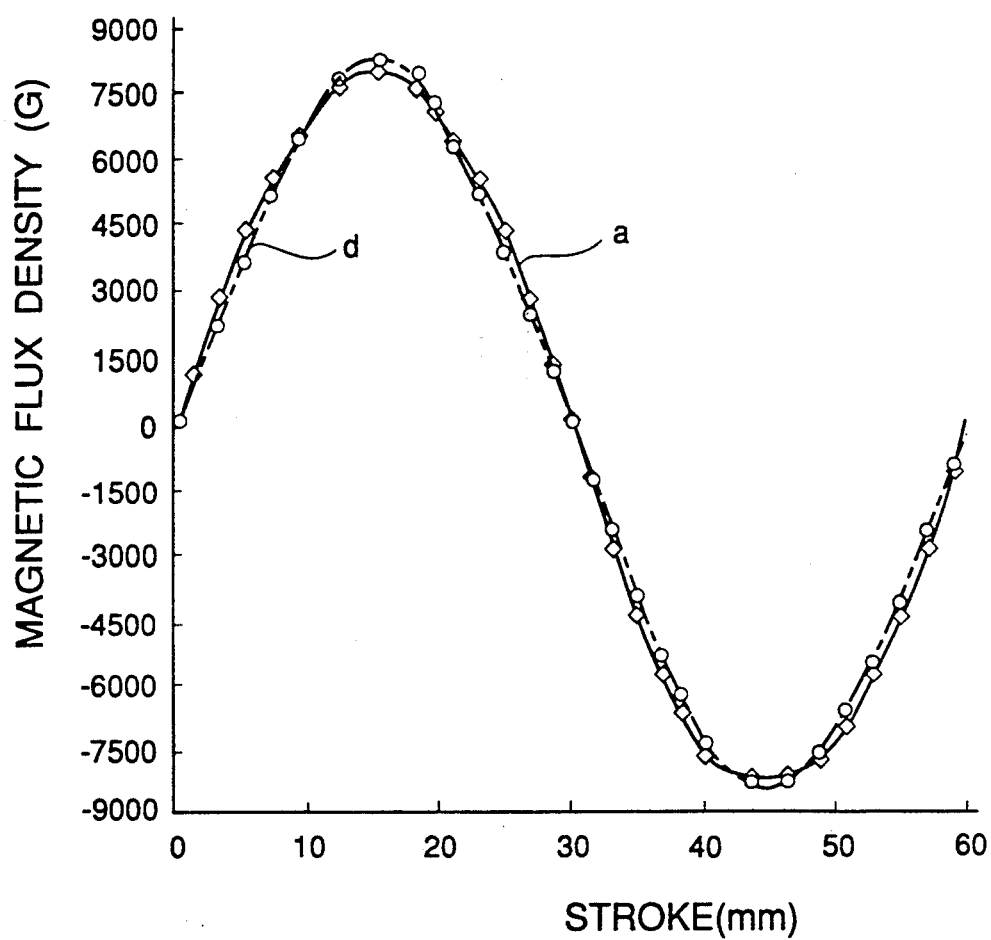
FIG. 9 is a graph showing the magnetic flux density distributions of the permanent magnets shown in FIGS. 4 and 8.
Figure 10:
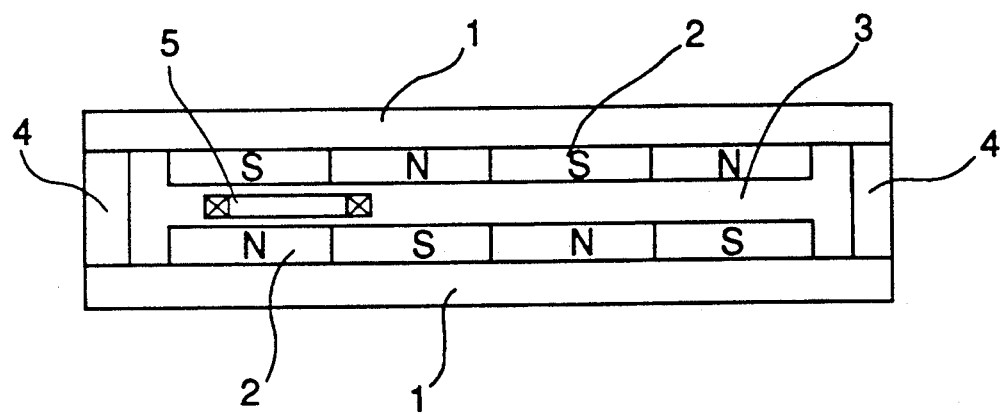
FIG. 10 is a schematic view showing a conventional linear motor.

FIG. 9 shows the magnetic flux density distributions of the permanent magnets of FIGS. 4 and 8. It is clear from FIG. 9 that the permanent magnet of FIG. 8 shows a magnetic flux density distribution (curve d) in a sharp wave form. Thus, it is concluded that the permanent magnet shown in FIG. 4 (curve a) is much more suitable for obtaining the sinusoidal magnetic flux density distribution than that of FIG. 8.

Because of the above permanent magnet shape of the present invention, the permanent magnet assembly provides a sinusoidal magnetic flux density distribution in the moving direction of the multi-phase coil, and the torque ripple can be drastically reduced by applying sinusoidal current to the coils. As a result, the linear motor of the present invention shows excellent linearity and thus drastically improved reliability.

What is claimed is:

1. A linear motor comprising:
   (a) at least one pair of permanent magnet assemblies opposing each other across a gap therebetween, each of said permanent magnet assemblies comprising a plurality of permanent magnets arranged end-to-end such that adjacent permanent magnets in each assembly have magnetic poles of opposite polarities on their surfaces facing said gap, and that permanent magnets opposing each other across said gap also have magnetic poles of opposite polarities on their surfaces facing said gap;
   (b) a movable member comprising at least one multi-phase coil assembly comprising a plurality of flat coils and movable in said gap in a direction parallel to the permanent magnet assemblies; and
   (c) a driving circuit for supplying an AC sinusoidal current to said multi-phase coil assembly, wherein each of said permanent magnets further comprises means for generating a sinusoidal magnetic flux distribution, said sinusoidal flux generating means including each of said permanent magnets having in a plane perpendicular to the moving direction of the movable member a cross section satisfying the relation: $Ac > Ae$, wherein $Ac$ represents a cross section in a center portion of said permanent magnet and $Ae$ represents a cross section at each end of said permanent magnet.

2. The linear motor according to claim 1, wherein said sinusoidal flux generating means further includes each of said permanent magnets having a thickness satisfying the relation: $Tc > Te$, wherein $Tc$ represents a thickness in a center portion of said permanent magnet, and $Te$ represents a thickness at each end of said permanent magnet, said thickness being measured along a direction toward said gap.

3. The linear motor according to claim 1, wherein said sinusoidal flux generating means further includes each of said permanent magnets having a width satisfying the relation: $Wc > We$, wherein $Wc$ represents a width in a center portion of said permanent magnet, and $We$ represents a width at each end of said permanent magnet, said widths being measured along a direction perpendicular to the direction toward said gap and also perpendicular to the direction of motion.

4. The linear motor according to claim 2, wherein each of said permanent magnet gap-facing surfaces consists of a substantially flat center portion of length Lc and slightly inclined and substantially flat side portions positioned on both sides of said center portion, wherein Lc/L is about 6/30, where L is the total length of the permanent magnet along the direction of motion, and wherein Te/Tc is about 6.5/10.

5. The linear motor according to claim 3, wherein each of said permanent magnets has sinusoidally shaped side surfaces.

6. The linear motor according to claim 2, wherein each of said permanent magnet gap-facing surfaces is convexly curved.

* * * * *